Oct. 5, 1937.  C. A. DUNHAM ET AL  2,094,738
EFFECTIVE TEMPERATURE CONTROL APPARATUS
Original Filed Jan. 8, 1932  6 Sheets-Sheet 3

Inventors
Clayton A. Dunham
and David N. Crosthwait, Jr.
By Barnett & Truman
Attorneys.

Oct. 5, 1937.  C. A. DUNHAM ET AL  2,094,738
EFFECTIVE TEMPERATURE CONTROL APPARATUS
Original Filed Jan. 8, 1932   6 Sheets-Sheet 4

Inventors
Clayton A. Dunham
and David N. Crosthwait, Jr.
By Barrett Truman
Attorneys.

Oct. 5, 1937.   C. A. DUNHAM ET AL   2,094,738
EFFECTIVE TEMPERATURE CONTROL APPARATUS
Original Filed Jan. 8, 1932    6 Sheets-Sheet 6

Inventors.
Clayton A. Dunham
and David N. Crosthwait, Jr.
By Barrett & Truman
Attorneys.

Patented Oct. 5, 1937

2,094,738

UNITED STATES PATENT OFFICE 2,094,738

EFFECTIVE TEMPERATURE CONTROL APPARATUS

Clayton A. Dunham, Glencoe, Ill., and David N. Crosthwait, Jr., Marshalltown, Iowa, assignors to C. A. Dunham Company, Marshalltown, Iowa, a corporation of Iowa Original application January 8, 1932, Serial No. 587,342. Divided and this application March 3, 1934, Serial No. 713,862

4 Claims. (Cl. 237—9)

This invention relates to new and useful improvements in effective temperature heating systems, and more particularly to improved means for automatically controlling a heating system so that the heat output will maintain a substantially constant condition of human comfort within the building being heated. This application is a division of our prior application Serial No. 587,342, filed January 8, 1932 (now Patent No. 2,064,197, granted December 15, 1936 in which the improved method is claimed. The present application covers the improved apparatus.

It is a matter of common experience that at times, even though a building is maintained at a fixed temperature, this temperature produces sensations of discomfort. For example a temperature of 70° Fahrenheit may, at times, cause a person to experience a sensation of being chilly. At other times, a temperature of 70° Fahrenheit may produce a sensation of being too warm. It is usual to encounter the first experience when the humidity is low, and the latter when the humidity is high, that is, when the moisture content of the air within the building is greater. Human comfort depends upon the heat dissipation by the skin surface. When the humidity increases, the heat abstraction from the skin for a given air movement and temperature decreases, and the sensation of being too warm results. When the humidity decreases, the rate of heat abstraction from the skin for the same air movement and temperature increases, with the result of producing a chilly sensation.

In previous efforts to produce a condition of constant comfort, the practice has been to control the humidity, as well as the temperature. To do this requires humidifying apparatus in addition to heating apparatus, which is commercially impracticable for many types of structures having various types of occupancy.

According to the method here used, constant comfort is provided by varying the temperature of the inside air with variations in humidity by increasing the rate of heat supply automatically as the humidity decreases, and vice versa. It has been determined experimentally that there exists certain combinations of temperatures and humidities for a given air motion which produce the same feeling of comfort or discomfort. These combinations of temperatures and humidities which produce equal conditions of comfort have been charted, and the lines passing through these equally effective air conditions are known as equal comfort lines, and the term "effective temperature" as used herein is used to indicate the constant temperature sensation, although the actual dry bulb temperature which produces this sensation will vary as the humidity varies. A maximum number of people will feel comfortable at an effective temperature of 64° Fahrenheit, and this is called the "comfort line". While at rest in still air, 97 per cent of all people are comfortable at this temperature.

In maintaining effective temperatures, it is essential not to produce chilly sensations, as a result of the absence of radiant heat. This means that heat must be supplied to a building at substantially the same rate the building is losing it, that is so long as heat supply is necessary, this heat should be supplied continually and not intermittently. Also, to maintain the most desirable comfort conditions, the temperature of the air in different parts of the rooms or at various elevations must be substantially uniform. The temperatures at the heights of the knee and at the floor and ceiling should approach the temperature at the breathing line as closely as possible. The foregoing is another way of saying that there must be minimum stratification of the air within the room or rooms with regard to temperature conditions. This latter condition is best maintained when the heating medium which supplies heat to the room does not impart excessive temperatures to the air passing over it in response to convection currents, and this requirement is best met when the appliance delivering the heat, maintains temperatures which approach, as closely as is possible, the temperature to be maintained. Excessive heating of the air passing over a steam radiator, for example, causes the temperature at the ceiling to be higher than is the case where the air passing over the radiator is not so highly heated. This condition is best maintained by utilizing steam at controlled sub-atmospheric pressures as the heating medium, as broadly disclosed in the patents to Clayton A. Dunham, No. 1,644,114, granted October 4, 1927, and to David N. Crosthwait, Jr. 1,977,303, granted October 16, 1934. The present invention relates to a modification of, and improvement on, the heating systems therein disclosed.

Obviously, the most satisfactory result in maintaining equal comfort conditions such as above described are only obtainable when the system is completely automatically controlled. According to the present invention, the supply of steam to the radiators is primarily controlled automatically in response to variations in the pressure differential between the supply and discharge sides of the radiators so as to constantly maintain the radiators filled or partially filled with steam at a temperature just sufficient to replace the heat loss from the building. In addition, thermostatic control mechanism is provided for cooperation with the pressure-control mechanism to insure the restricting of temperature variations within the building within certain predetermined limits.

In addition, humidity responsive mechanism cooperates with the thermostatic control mechanism so as to vary the actual temperature maintained in accordance with variations in humidity so that a substantially constant predetermined effective temperature will be maintained within the building, thus producing approximately constant comfort conditions. In addition, this invention includes various improvements in details of the control mechanism and combinations thereof, whereby these equal comfort conditions are automatically and constantly maintained, or varied at different times in the day as circumstances may require or make desirable.

The general object of this invention is to provide an improved heating system for maintaining constant comfort conditions within a building, as briefly described hereinabove and disclosed more in detail in the specifications which follow.

Another object is to provide an improved apparatus for proportioning the rate of heat supply to a building so as to maintain effective temperatures.

Another object is to provide an improved combination pressure and temperature actuated control mechanism for a heating system.

Another object is to provide an improved combination pressure controlled, temperature controlled and humidity controlled mechanism for regulating a steam heating system.

Another object is to provide an improved steam regulating apparatus which is controlled both thermostatically and hygroscopically.

Another object is to provide improved mechanism for changing the effective temperatures maintained throughout the day, involving the use of separate day and night thermostats.

Another object is to provide improved apparatus for automatically maintaining temperatures within a building which yield equal comfort conditions to human occupants.

Another object is to provide an improved automatic control of all of the auxiliaries of a steam heating system in proper sequence so as to supply steam continually and at as low a temperature as is possible to maintain the desired effective temperature.

Another object is to provide means at a single location for indicating the relative movements of various cooperating parts of the heating system, and means at this location for enabling the operator to manually control the heating system if conditions should require this or make it desirable.

Another object is to provide improved means for controlling the operation of the pump or exhausting mechanism of the sub-atmospheric heating system so as to most effectively cooperate with the other features of the control mechanism.

Other objects and advantages of this invention will be more apparent from the following detailed description of certain approved forms of apparatus designed and constructed according to the principles of this invention and cooperating to produce the desired results as hereinabove and hereinafter disclosed.

Figure 1:
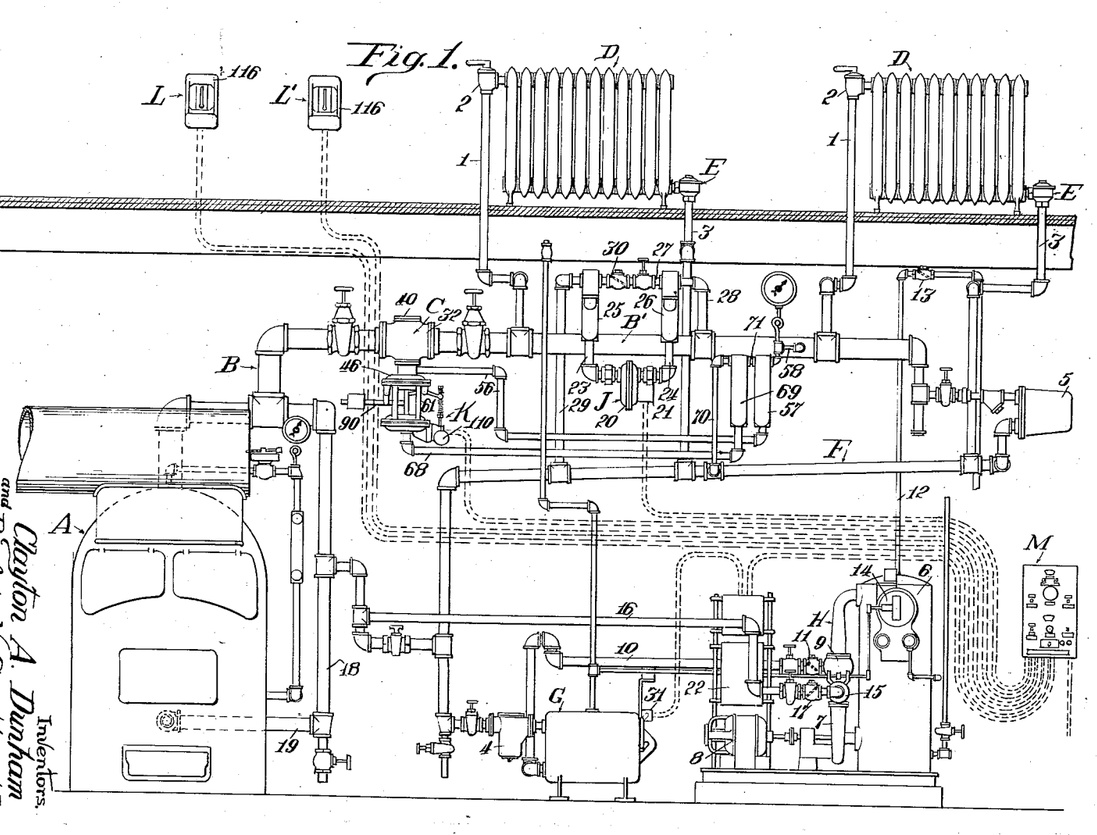
Fig. 1 is a diagrammatic elevation of a sub-atmospheric steam heating system with the improved control mechanism applied thereto.

Reference will first be made to Fig. 1 which shows a heating system of the type with which this improved control mechanism is best adapted to cooperate, although as will be hereinafter apparent the control mechanism may be used with other types of heating systems.

The heating system here shown is of the sub-atmospheric steam heating type disclosed in the Crosthwait Patent 1,977,303, hereinabove referred to. This heating system comprises a boiler or generator A from which the steam flows through supply main B and the improved flow control valve C into the portion B' of the steam main, from which the radiators D are supplied. At the outlets of the radiators are steam traps E, F is the return main, G is an accumulator tank for the condensate, the exhausting mechanism is indicated generally at H, and J indicates the differential pressure controller for the exhausting mechanism. At K is indicated generally an electric controlling mechanism for the valve C, at L and L' are indicated the improved thermostatic control devices, and M is the improved control panel through which all of the manual and automatic control operations are coordinated, and on which the condition of the different elements of the heating system is indicated.

The reduced pressure steam in main B' passes through risers I and inlet valves 2 into the respective radiators D. Suitable orifice plates, such as disclosed in the Dunham patent hereinabove referred to, may be interposed in the respective risers I, preferably between the inlet valves 2 and the radiators for proportioning the steam flows to the respective radiators in accordance with the size or condensing capacity and location thereof. The steam traps E are adapted to close when the radiators are filled with steam and prevent the escape of steam therefrom. When condensate and non-condensable gases accumulate in the radiators, the traps E will open and permit the condensate and non-condensable gases to flow out or to be drawn out by the lower pressure maintained in the return side of the heating system. These gases and the condensate flow through pipes 3 into return main F and thence through the strainer 4 into the accumulator tank G. In a similar manner, the condensate and gases accumulating in the portion B' of the supply main pass out through float and thermostatic trap 5 into return main F and thence into the accumulator tank. The exhausting mechanism H comprises a separator tank 6 and a pump 7, driven by motor 8 to withdraw water from the lower portion of tank 6 and force it through ejector 9 and thence back into the upper part of tank 6, together with the gases and condensate which are withdrawn from accumulator tank G through pipe 10 and check-valve 11 into the exhauster casing. The gases are vented from separating tank 6 through pipe 12 provided with outwardly opening check valve 13. When a certain amount of liquid has accumulated in tank 6, a float-controlled mechanism, indicated generally at 14, operates to open a normally closed valve 15 so that the pump 7 can force a part of the liquid out through pipe 16 provided with check valve 17, and thence through pipes 18 and 19 into the boiler.

The exhausting mechanism H is operated whenever it is necessary to build up the pressure differential between the supply and discharge sides of the heating system, or whenever it is necessary to transfer accumulated condensate from the accumulator tank G into the separating tank 6. The control mechanism J comprises a differential-pressure controller 20 which automatically opens and closes a switch 21 which operates through starter 22 to control the motor 8. The differential pressure controller comprises a diaphragm subjected on its opposite sides to the pressures existing in the supply and return sides of the heating system. For this purpose control pipes 23 and 24 extend to surge tanks 25 and 26 positioned in the horizontal section 27 of an equalizing pipe extending between the supply and return sides of the heating system, in the example here shown the relatively high pressure end of pipe 27 communicating through pipe 28 with the supply main B' and the relatively low pressure end communicating through pipe 29 with the return main F. A check valve 30 is positioned in the equalizing pipe 27 between the relatively high pressure surge tank 26 and the relatively low pressure surge chamber 25. This valve opens toward the high pressure side of the system and will normally remain closed unless for some reason a lower pressure temporarily exists in the supply main than the pressure in the return main, whereupon valve 30 will open to equalize the pressures. This control mechanism J will operate, in a well known manner, to cause the exhausting mechanism to function whenever the pressure differential between the supply and discharge sides of the heating system falls below a predetermined minimum, and to throw the exhausting mechanism out of operation whenever the desired pressure differential has again been established. Also, a float-controlled mechanism in the accumulator tank G (disclosed in detail in the Dunham patent referred to above) acts through switch mechanism 31 to start the operation of exhausting mechanism H whenever a predetermined amount of condensate has accumulated in the tank G.

Figure 2:
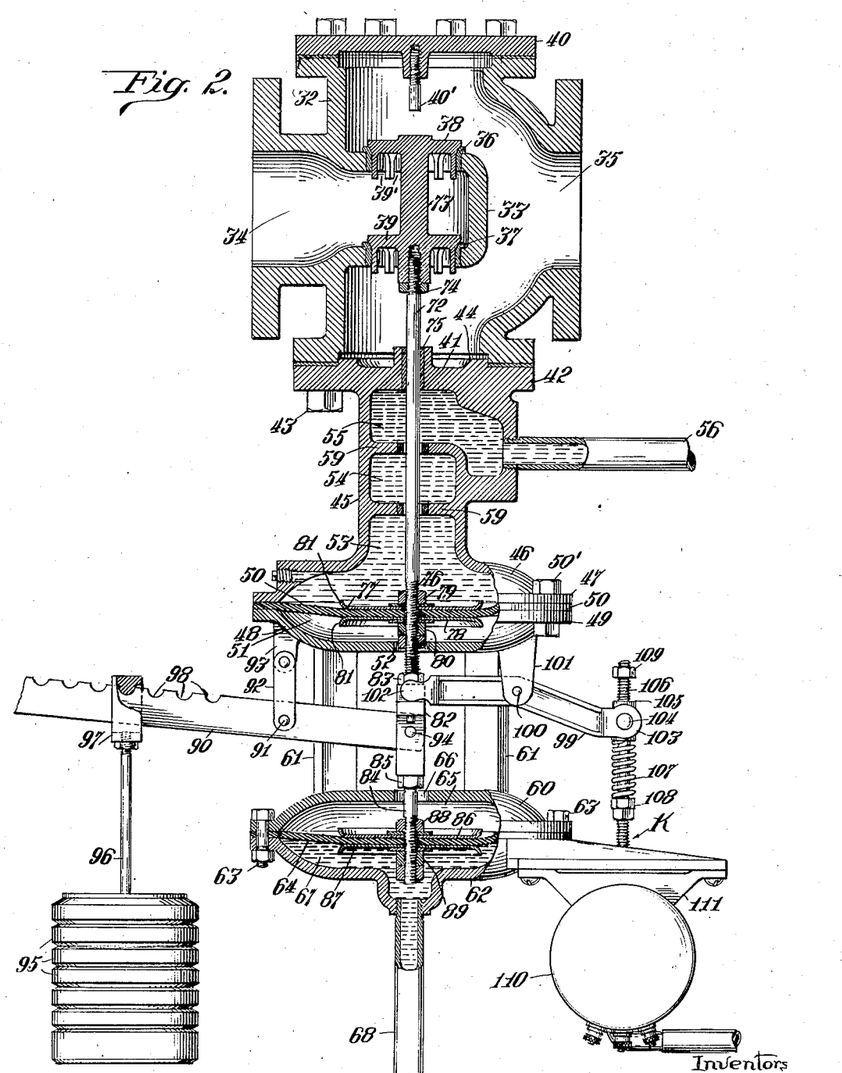
Fig. 2 is a central vertical section through the improved steam-control valve.
Figure 3:
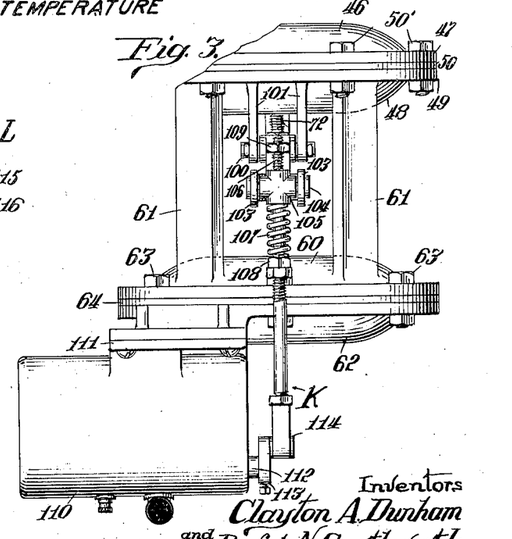
Fig. 3 is a partial side elevation of the control valve, looking from the right at the lower portion of the mechanism shown in Fig. 2.

The improved control valve C will now be described, referring to Figs. 2 and 3, in addition to Fig. 1. This valve comprises a casing 32, having an internal web 33 separating the high pressure chamber 34 from the relatively low pressure chamber 35. The high pressure chamber 34 is connected with the supply main B leading from the boiler, and relatively low pressure chamber 35 connects with the portion of the supply main B' from which the radiators are supplied with low pressure steam. The web 33 is formed with the aligned valve seats 36 and 37, with which cooperate respectively the connected and substantially balanced valves 38 and 39. Each of the valves 38 and 39 is preferably of the sleeve type here shown, with the slots or openings 39' in the sleeve walls so designed that the total area of the valve opening will increase by equal increments as the valve is moved upwardly. A removable closure plate 40 permits access to the upper portion of the casing 32. A closure plate 41 covers the opening in the lower portion of casing 32, this closure plate having an outwardly projecting flange 42 secured to the casing by bolts 43, and an upwardly projecting flange 44 to center the plate 41 properly within the opening in the lower portion of the casing. This closure plate 41 is formed integrally with an upward extension 45 of the diaphragm casing 46. This upper dished diaphragm casing member 46 is formed at its lower edge with an outwardly extending flange 47, and a similar lower diaphragm casing member 48 is formed on its upper edge with an outwardly extending flange 49. The two casing members 46 and 48 are clamped together at opposite sides of an enclosed flexible diaphragm 50 by means of a plurality of bolts 50' passing through the flanges 47 and 48 and the peripheral portion of diaphragm 50. The chamber 51 within the lower casing member 48 is open to the atmosphere through central passage 52. The chamber 53 above the diaphragm 50 is connected through intermediate chamber 54 with an upper chamber 55 from which leads a pipe 56 which extends to a surge chamber 57 communicating through pipe 58 with the supply main B'. The chambers 53, 54 and 55 are all at substantially the same pressure, but the intermediate webs or baffles 59 are designed to prevent the formation of convection currents in the liquid that accumulates above the diaphragm and thus prevent undue heating of the diaphragm 50 from the steam passing through casing 32. The upper portion 60 of the lower diaphragm casing is supported from the lower portion 48 of the upper diaphragm casing by means of a plurality of struts 61. The lower member 62 of this lower diaphragm casing is clamped to the casing member 60 by means of a plurality of bolts 63 so as to enclose a second flexible diaphragm 64 similar to the first described diaphragm 50. The chamber 65 above diaphragm 64 is open to the atmosphere through central passage 66. The lower diaphragm chamber 67 is connected through pipe 68 with a surge chamber 69 which in turn is connected through pipe 70 with return main F. The surge chambers 57 and 69 may be conveniently positioned adjacent one another and connected by the supporting member 71, although there is no fluid connection between these two chambers.

The upper end of a valve stem 72 is threaded in valve structure 73 and provided with a lock nut 74. The valve stem 72 is slidable through a guide bearing 75 in the closure plate 41 and also passes vertically downward through central passages in the webs 59. The lower threaded portion 76 of stem 72 passes through diaphragm 50 and is sealed thereto by means of the diaphragm plates 77 and 78 held in place by nuts 79 and 80. The outer edges of the diaphragm plates are preferably curved, as indicated at 81, to prevent any cutting action on the diaphragm as it is flexed. The lower end of the stem 72 is screwed into the yoke 82 and locked in place by nut 83. A lower valve stem 84 is similarly threaded into the lower side of yoke 82 and locked in place by nut 85. This valve stem 85 is sealed into the lower diaphragm 64 by means of diaphragm plates 86 and 87 held in place by nuts 88 and 89, in the same manner as the upper valve stem is attached to the upper diaphragm.

A lever 90 is intermediately pivoted at 91 to the lower end of a fulcrum link 92 suspended from lug 93 on the lower diaphragm casing member 48. One end of lever 90 is pivoted at 94 within the yoke 82. The other arm of lever 90 carries a weight 95 suspended by stem 96 and yoke 97 which is adapted to rest in any one of a plurality of notches 98 spaced lengthwise of the longer arm of lever 90. It will be apparent that by adjusting the weight 95 outwardly on the lever arm 90, the upward pressure exerted on the movable valve assembly will be increased.

A stop crew 40' mounted in the bottom of closure plate 40 limits the upward movement of valve assembly 73.

It will be noted that opposed sides of the two connected diaphragms 50 and 64 are exposed to atmospheric pressure, but the upper side of the upper diaphragm 50 is subject to the pressure in the supply side of the heating system, whereas the lower side of lower diaphragm 64 is subject to the pressure in the return side of the heating system. Therefore, the net force tending to move the valve assembly downwardly to close the valve is always equal to the pressure differential between the supply and return sides of the system. It will now be apparent that when this downward force exerted by the pressure differential just equals the upward force exerted by the adjustable weight 95, the valves will be in a state of rest or equilibrium. If the pressure differential increases above this fixed normal, there will be a tendency to overcome the effect of weight 95 and close the valves. On the other hand, if the pressure differential decreases, the weight 95 will overcome the fluid pressure and open the valves.

In case the valves 38 and 39 are absolutely balanced, that is of equal size, the device will operate as above described. In case a semi-balanced valve assembly is used, the varying pressure effect may be compensated for by employing larger diaphragm plates on one of the diaphragms than the diaphragm plates used on the other diaphragm. This will change the effective area of the flexible diaphragms and compensate for the unbalanced areas of the two valves. The unbalanced pressure due to the difference in elevation between the two diaphragms 50 and 64 may be compensated for by a proper variation in the relative sizes of diaphragm plates 77, 78 and 86, 87.

In the general operation of the heating system as thus far described, the desired steam pressure in the boiler A and supply pipe B is obtained by proper control of the fires beneath the boiler A, or by the dampers or other heat controlling mechanism with which the generator is supplied. The weight 95 is set to respond to a predetermined pressure differential between the supply and return sides of the system, and the differential controller J will be regulated to maintain substantially the same or a somewhat smaller pressure differential. Assuming that the temperature in the building is below that at which the thermostat L (or L' as hereinafter described) operates to close the valve C, and that the system is not yet filled with steam, the weight 95 will operate to open the valves 38 and 39 and permit a free flow of steam through the valve C. The exhausting mechanism H will now be in operation to lower the pressure in the return main, and this exhausting action will extend throughout the system since the traps E are now open. The traps will remain open until the radiators D are filled with steam, and during this time the exhausting mechanism will be unable to establish any material pressure differential between the supply and return mains. When the steam fills the radiators D and reaches the traps E, the traps will automatically close, after which the exhausting mechanism H will be able to establish a lower pressure in the return main F than exists in the supply main B'. As this pressure differential reaches the predetermined value, it will act on the diaphragms 50 and 64 to overcome the effect of weight 95 and tend to close the valves 38 and 39, thus throttling the flow of steam to the radiators. As the operation of the valve is gradual, the valve in closing will reach a position where the rate of steam supplied to the radiators is approximately equal to the rate of steam consumption or condensation in the radiators, so that the differential will remain substantially constant and the valve will tend to remain in a state of rest or equilibrium in that position for feeding steam to the system at the rate at which it is required. If, for any reason, the rate of steam supply should exceed the desired rate of heat emission from the radiators, or that rate at which the radiators will condense steam to compensate for the heat lost from the building, the pressure differential will increase and the valve C will tend to close. The condensing rate of the radiators will then exceed the rate at which steam is being supplied and the supply pressure will drop so that the differential will diminish and the valve C will tend to open again under the influence of weight 95. It will be apparent that any increase in pressure differential will tend to cause the valve to close and any decrease in the differential will tend to cause it to open, and that the gradual action of the valve in opening and closing between its extreme limits of travel will permit it to reach a position of substantial equilibrium that maintains the steam supply substantially equal to the condensing rate.

It will now be apparent that in view of the fact that the valve C will act to maintain the proper differential at all times and that this can only be accomplished when steam is filling the system at the rate that the system is condensing it, the valve C will act to maintain varying steam pressures in the radiating system in accordance with outside temperatures. This will result in the heat emission from the radiators remaining substantially equal to the heat loss from the building.

It is to be noted that in the construction of the improved control valve C no stuffing boxes are required. One side of each of the movable diaphragms 50 and 64 is exposed to the atmosphere, whereas the pressure chambers at the other sides of the respective diaphragms will become filled with liquid so as to prevent the direct contact of steam with the diaphragms, thus effectively sealing the system against the loss of fluid pressure and prolonging the life of the diaphragms by protecting them from the direct action of the gases in the system.

The construction and operation thus far described is substantially the same as that disclosed and claimed in the Crosthwait Patent 1,977,303, hereinabove referred to.

In addition to the pressure-operated controlling mechanism hereinabove described, thermostatic means is provided for automatically closing the valve or limiting its closing movement in accordance with variations from a predetermined temperature to be maintained throughout the building that is being heated. Furthermore, humidity responsive means is combined with the thermostat so as to vary the standard temperature maintained by the thermostat and its cooperating control mechanism in accordance with variations in the relative humidity of the air within the building so as to maintain a substantially constant "effective" temperature, that is a constant comfort condition.

The valve C is under the direct control of a motor mechanism indicated generally at K, which is designed to move the valve an amount proportionate to the variation from the standard effective temperature as registered by the thermostatic mechanism L. Referring again to Figs. 1, 2 and 3, an operating lever 99 is intermediately pivoted at 100 between brackets 101 projecting downwardly from the upper diaphragm casing 48. The inner end 102 of lever 99 is adapted to engage a portion of yoke 82 so that downward movement of this inner arm of lever 99 will positively pull valve stem 72 downwardly to close the valves 38 and 39. However, the inner arm of lever 99 can swing upwardly independently of the yoke 82. In this manner the lever 99 is operable to close the valves or to limit the amount of their opening movements, but the actual opening movement of the valve is under the control of the pressure-operated mechanism previously described. A yoke 103 formed at the outer end of lever 99 is pivoted at 104 to a slide block 105 mounted on the operating stem 106. A compression spring 107 surrounds the stem 106 and is confined between block 105 and an adjustable nut 108. At 109 is a stop nut adjustably mounted on the upper end of the stem 106 to limit the upward movement of block 105. At 110 is indicated a small motor assembly which is supported by a bracket 111 projecting from the lower portion of the valve assembly. A rotary operating shaft 112 projects from the motor casing 110 and carries at its outer end a crank arm 113, to which the lower end of operating stem 106 is pivotally connected at 114. Operating means (hereinafter described) are provided within the casing 110, whereby crank arm 113 will be rotated intermittently, in one direction or the other, an amount proportionate to the variation from a certain predetermined effective temperature as registered by the thermostatic mechanisms L positioned at suitable locations within the building. This movement will be transmitted through stem 106 and spring 107 to the operating lever 99, which will impart a corresponding closing movement to the valves 38 and 39, or will so position the inner end 102 of lever 99 as to limit or restrict the possible opening movement of these valves.

Figure 4:
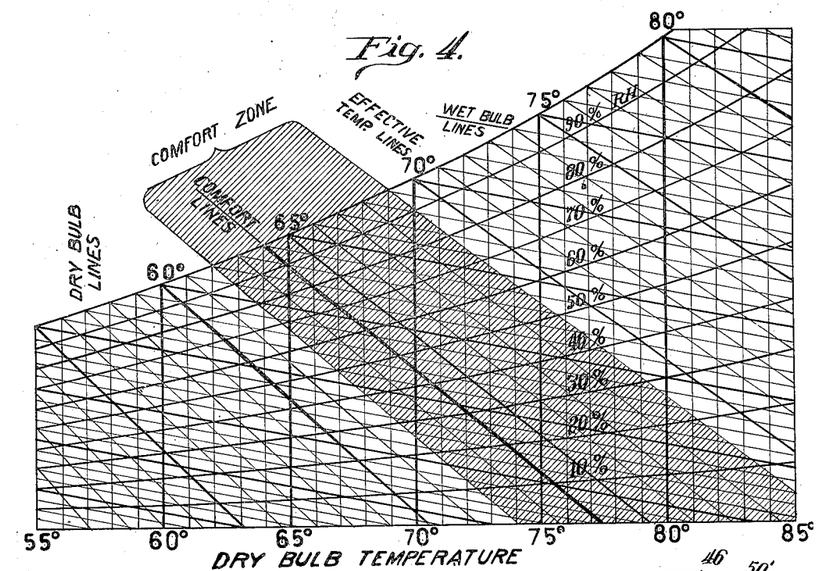
Fig. 4 is a comfort chart illustrating the combinations of dry bulb temperatures and percentages of humidity which corresponds to the effective temperatures.

Brief reference will now be made to Fig. 4 to explain more clearly the "effective temperatures" which the mechanism now about to be described is designed to establish and maintain. Referring to this chart, the ordinary dry bulb temperature readings are indicated by the vertical lines, and are read on the horizontal scale at the bottom of the chart. The wet bulb temperature readings are indicated on the scale along the top of the chart, and by the approximately horizontal lines sloping downwardly toward the right. The percentages of relative humidity in the air are indicated by the lines curving upwardly from the left hand side of the chart. The lines sloping downwardly at approximately 45° from the upper left to the lower right of the chart are the effective temperature lines, that is lines indicating temperature and humidity combinations which will produce sensations of constant comfort to the occupants of the building. The shaded area is known as the comfort zone (any effective temperatures within this zone being considered comfortable by the average human being), and the heavy line passing through the point corresponding to dry bulb and wet bulb readings of 64° and 100% humidity is known as the "comfort line", the combinations of dry bulb temperatures and humidities corresponding to points on this line producing ideal comfort conditions for the majority of people. For example, with entirely saturated air, a dry bulb temperature of 64° will establish an approximately ideal condition of comfort within the building. If the air has a 50% relative humidity, the ordinary dry bulb temperature should be approximately 69°. For a 10% relative humidity, the ordinary temperature reading would be 76°, etc. It will thus be seen that in order to maintain a desired "effective" temperature of, for example, 64°, it is necessary to vary the ordinary or dry bulb temperature of the air within the building in accordance with changes in the relative humidity of the air. In other words, the thermostatic mechanism hereinafter described does not maintain an absolutely standard dry bulb temperature, but varies this standard temperature in accordance with changes in the relative humidity of the air, so as to maintain a constant standard effective temperature which will maintain constant conditions of comfort.

Referring now more particularly to Figs. 5, 6, 7 and 8, the instrument here disclosed by way of example for maintaining the desired standard effective temperature by responding simultaneously to variations in the dry bulb temperature and also to variations in the humidity of the air, will be described in detail. This instrument is not herein specifically claimed, but is disclosed and claimed in the divisional application Serial No. 752,623, filed November 12, 1934. The operating elements of this instrument are mounted on a supporting base 115, and enclosed by a removable casing or cover 116 provided with openings 117 for the free passage of air therethrough. On cover 116 is mounted an ordinary dry bulb thermometer 118, at the right of which is a scale 119 indicating the dry-bulb temperature, and at the left, a scale 120 indicating the corresponding relative humidity. This thermometer is merely for the benefit of the observer at this location and forms no part of the automatic controlling mechanism. It does indicate the actual temperature that is being maintained as well as the actual relative humidity.

Figure 6:
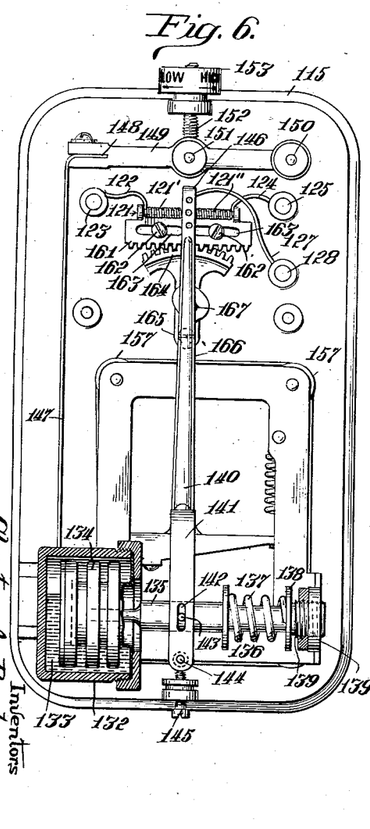
Fig. 6 is a front elevation of the thermostat with the cover removed, the thermostatic element being shown in vertical section.
Figure 7:
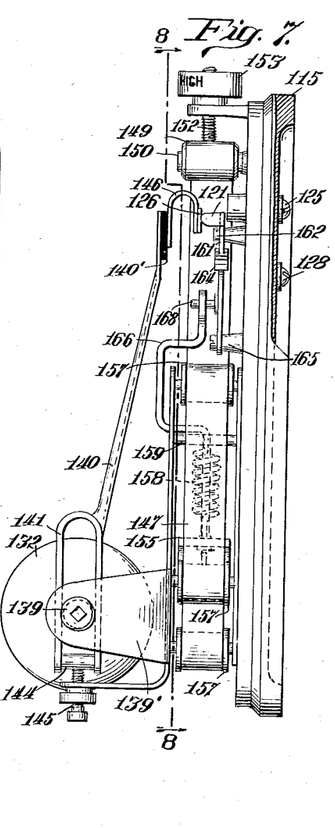
Fig. 7 is a side elevation looking from the right at the apparatus shown in Fig. 6.
Figure 8:
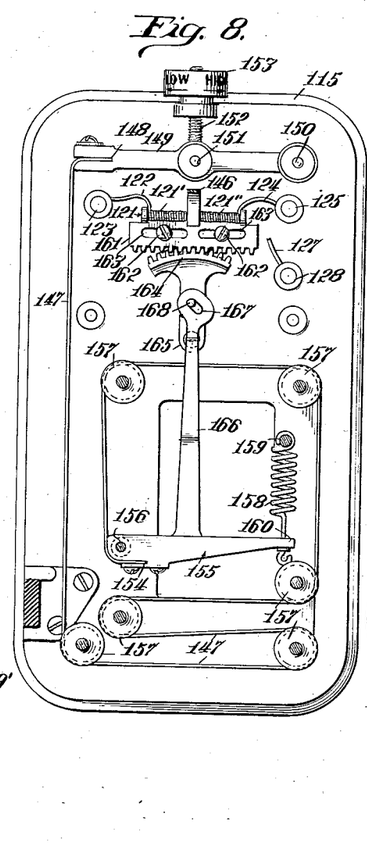
Fig. 8 is a vertical section, taken substantially on the line 8—8 of Fig. 7.

Referring now to Figs. 6, 7 and 8, a suitable electric resistance element 121, preferably in the form of an exposed resistance coil, is connected at one end by wire 122 with a binding post 123, and is connected at the other end by a wire 124 with a binding post 125. A contact member 126 is in constant engagement with the resistance element 121 intermediate the ends thereof, and is movable to adjust its position on the resistance by mechanism hereinafter described. This movable contact 126 is connected by wire 127 with a binding post 128. The three control wires 129, 130 and 131 (see Fig. 10) extend respectively from the binding posts 128, 123 and 125. It will be noted that the resistance 121 is divided into two effective resistances 121' and 121", the relative values of which will change, dependent upon the position of movable contact 126 intermediate the ends of resistance 121. One of these resistances 121' is positioned between two of the circuit wires, such as 129 and 130, and the other resistance 121" is positioned between the other two circuit wires 129 and 131. The variations in the relative currents passing through these two circuits (depending upon the relative values of the resistance sections 121' and 121") operate through mechanism hereinafter described to cause proportionate movements of the valve-controlling lever 99 in one direction or the other.

The thermostatic element is here shown in the form of a hermetically sealed casing 132 containing a quantity of temperature responsive fluid 133, one wall of the casing being in the form of a flexible diaphragm or bellows 134. The volume of the fluid 133 will change in accordance with changes in temperature, and the flexible bellows 134 will expand or contract in order to adjust the capacity of vessel 132 to the volume of the heat responsive fluid 133. An operating stem 135 extends from the movable end of bellows 134 and is provided with a fixed collar 136 engaging one end of a compression spring 137 which abuts at its other end against a collar 138 on a screw 139 adjustable in a fixed bracket 139'. The reduced end portion of stem 135 is slidable in the hollow screw 139. The spring 137 opposes the movement of the plunger stem 135, and by adjusting the position of screw 139, the amount the thermostat will move for a given temperature change can be varied. A lever 140 is formed with a yoke 141 which straddles the plunger 135, the arms of the yoke being slotted at 142 to receive the ends of a pin 143 secured in the plunger. The lower end of lever 140 is fulcrumed at 144 on an adjusting screw 145. The contact member 126 is carried on an insulating block 140' at the upper end of lever 140 by means of the bowed spring 146 which holds the contact yieldably in engagement with resistance 121. It will be apparent that the thermostat 132, through plunger 135 swings lever 140 about its fulcrum 144 and thus moves contact 126 longitudinally of resistance 121. By adjusting the fulcrum screw 145, the relative lengths of the upper and lower arms of lever 140 can be changed, thereby adjusting the rate of movement of contact 126 longitudinally of resistance 121 in response to any given temperature responsive movement at the thermostat.

The humidity responsive mechanism comprises a long hygroscopic strip or membrane 147 which is anchored at one end 148 to a lever 149 fulcrumed at its opposite end 150 on the base 115, and intermediately pivoted at 151 to an adjusting screw 152 extending upwardly through an adjusting nut 153 mounted at the top of the casing. The other end of the hygroscopic strip 147 is secured at 154 to the bell-crank 155 fulcrumed at 156. The strip or membrane 147 is so formed that it will vary its elongation with changes in the relative humidity of the air, the strip elongating with increasing humidity and contracting as the humidity decreases. In order to utilize a membrane of sufficient length to give a relatively large operating movement, the membrane or strip is passed around a plurality of direction pulleys 157. The spring 158 anchored at one end 159 and attached at its other end to one arm 160 of the bell-crank, serves to keep the flexible strip 147 under tension, so that any changes in the length thereof will cause swinging movement of bell-crank 155 about the fulcrum 156. The operative effect of the hygroscopic strip 147 may be varied by turning the adjusting nut 153.

The resistance element 121 is adjustably mounted on a longitudinally movable rack bar 161 by means of screws 162 adjustable in slots 163 in the rack bar. A gear sector 164 meshes with rack bar 161 and is pivotally mounted on the base member at 165. The upwardly extending arm 166 of bell-crank 155 is formed with a cam slot 167 in which engages a pin 168 projecting forwardly from the gear sector 164.

It will now be apparent that the contact member 126 is moved longitudinally of resistance 121 a distance which is proportional to dry bulb temperature changes to which the thermostatic element 132 responds. At the same time, the resistance element 121 is moved bodily, in the direction of its own length, in response to changes in the relative humidity of the air. Assuming, for example, that the air within the building is at a temperature (dry bulb temperature) of 68°, and the relative humidity of the air is 60%. It will be noted from the comfort chart that this corresponds approximately to a point on the "comfort line", that is corresponding to an effective temperature of 64°, and if the mechanism is in proper adjustment the contact 126 should be positioned substantially equi-distant between the two ends of resistance 121, as shown in the drawings. Assuming now that the temperature of the air should be raised to 72° and that the relative humidity remains constant at 60%, an effective temperature of approximately 67° will prevail and it will be desirable to reduce the rate at which heat is imparted to the air by the heating system so as to lower the temperature to the desired temperature of 68°. Under these circumstances, the resistance 121 does not move, but the contact 126 moves toward the right hand end of the resistance, so as to increase the resistance 121' and decrease the resistance 121" in proportion to this variation in temperature from the desired effective temperature, and this variation in the values of the resistances 121' and 121" will operate, in the manner hereinafter described, to effect a corresponding and proportionate adjustment of the heating system. Let us now assume that at the same time the temperature increases from 68° to 72°, there has been a drop in the relative humidity of the air from 60% to 30%. It will be noted that a temperature of 72° and a relative humidity of 30% correspond approximately to another point on the 64° effective temperature comfort line, so that under these conditions there is no reason why there should be any change in the adjustment of the heating system. The parts are so adjusted that this decrease in the relative humidity will cause a contraction of membrane 147 sufficient to swing the lever 166 and through cam slot 167 and pin 168 oscillate the gear sector 164 and through rack 161 cause a longitudinal movement of resistance 121 to the right just sufficient to compensate for the movement of contact member 126 so that the resistance and contact will maintain approximately the same relative positions now shown. If the relative humidity had only dropped to 50%, it will be noted from the comfort chart that the corresponding effective temperature (with a dry bulb temperature of 72°) is approximately 66°. The desirability of a decrease in the heat output from the heating system is thus indicated, although not as great a change as would be indicated by a dry bulb temperature of 72° if there had been no change in the original relative humidity of 60%. Accordingly, the resistance 121 is moved a short distance to the right by the hygroscopically responsive mechanism, but not as great a distance as the contact member 126 has been moved, so that there still remains a proportionate change in the two resistance sections 121' and 121'' to effect a proper proportionate adjustment of the heating system. Obviously, if the relative humidity should rise at the same time that the temperature rises, the resistance 121 and contact 126 will be moved in opposite directions so as to produce a correspondingly greater increase in the proportionate change of resistances 121' and 121''. It will be noted from a study of the comfort chart that the increments of temperature change are not uniform for equal increments of humidity change. That is, as the humidity decreases, the dry bulb temperature must increase at a more rapid rate, and vice versa. Accordingly, the cam 167 has been provided, which is so proportioned that the movements of the resistance element 121 will be in proper relation to the movements of the contact member 126 to maintain the desired effective temperature.

In the installation here shown by way of example, two separate thermostats L and L' are employed, one of these thermostats, such as L, controlling the operation of the heating system during the day time, and the other thermostat L' being adjusted to maintain a lower effective temperature during the night. Both of these thermostats may be of the improved type, hereinabove described, or the night thermostat L' may be of a simpler type, designed to respond to changes in temperature only. In fact, both of these thermostats, or the single thermostat, if only one is used, may omit the hygroscopic control feature as far as certain phases of this invention are concerned, as covered by certain of the claims which follow hereinafter. By employing two separate thermostats L and L', the time controlled element may be mounted on the control panel M, thereby avoiding the necessity of incorporating the clock control mechanism in the thermostat itself. On the other hand, a single time controlled thermostat could be used if desired.

It is sometimes desirable to employ a plurality of thermostats positioned in a plurality of locations throughout the building, and so connected with one another and with the valve controlling mechanism that the heating system will be regulated in response to the average effective temperature registered by all of these thermostatic mechanisms. In such case, each thermostatic mechanism should be modified to embody a pair of separate resistances 121 and engaging contact members 126, and the several thermostats will be connected in series, all as disclosed and claimed in Patent No. 1,921,172, granted August 8, 1933 to Elbert A. Taylor et al.

Figure 10:
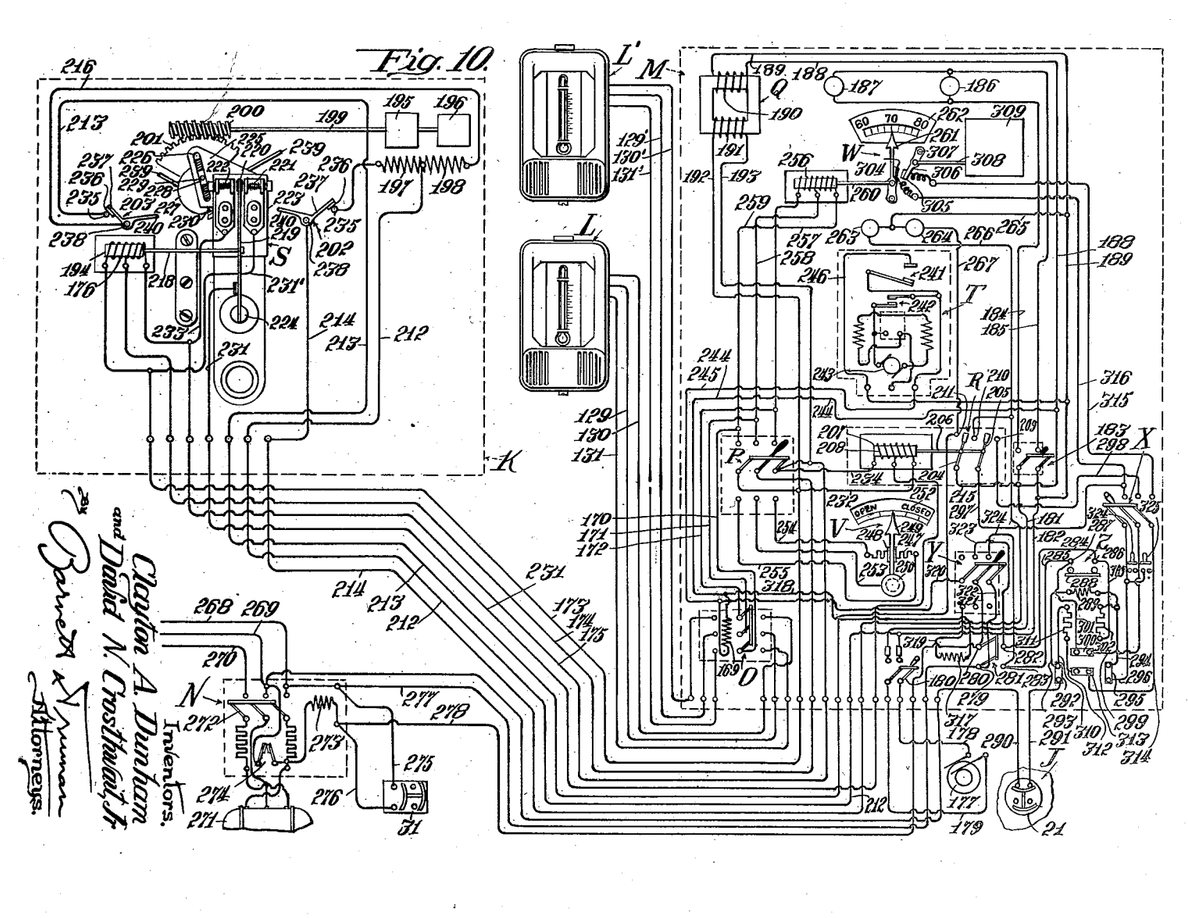
Fig. 10 is a wiring diagram of the control panel, the thermostats, the motor mechanism for operating the valve and the pump controlling mechanism.

Referring now to the wiring diagram shown in Fig. 10, enclosed in the broken lines indicated at M at the right of the figure is the mechanism mounted in the control panel. At the left of the figure, in the enclosure indicated at K is shown the proportioning motor mechanism and cooperating parts which may be mounted in or adjacent the casing 110 carried by the valve C. At N is indicated the wiring for the pump-control mechanism which may, if desired, be located adjacent the motor 8 and starter 22.

In the panel board M is mounted a double-throw triple contact automatic switch O which is normally thrown to the right when day thermostat L is in control, but which is automatically thrown to the left by solenoid 169 in order to place night thermostat L' in control of the heating system. The three control wires 129, 130 and 131 leading from thermostat L are connected with the three fixed contacts at the right of switch O. The corresponding circuit wires 129', 130' and 131' leading from thermostat L' extend to the corresponding set of fixed contact members at the left of switch O. At P is indicated a double-throw, triple contact, manually operated switch whereby the heating system may be thrown alternatively from automatic control (by means of the thermostats) to manual control, by means of mechanism hereinafter described. When switch P is thrown to its upper position, the heating system will be under the automatic control, the three fixed upper contact members of this switch being connected by wires 170, 171 and 172 with the three movable contact members of automatic switch O. From the three movable contact members of switch P extend wires 173, 174 and 175, which lead to the motor mechanism K, wire 174 connecting with the central portion of a solenoid coil 176, and the two wires 173 and 175 extending respectively to the two ends of this coil. At 177 is indicated a suitable source of electric power from which leads 178 and 179 extend to the main line switch 180 positioned on the panel board. From switch 180, wires 181 and 182 lead to the panel-light switch 183, from which wires 184 and 185 lead to the panel lights 186 and 187 by means of which the mechanism mounted on the panel is illuminated. From the power lines 181 and 182, wires 188 and 189 lead to the primary 190 of a transformer Q. The secondary 191 of transformer Q supplies reduced voltage current through wires 192 and 193 which are joined to wires 173 and 175, respectively, of the thermostatic control circuit.

Assuming now that the power is on, (switch 180 closed), that automatic switch O is thrown to the right and manual switch P is thrown to its upper position, whereby thermostat L is in automatic control of the system, a low voltage control circuit is completed from secondary 191 of the transformer Q, this circuit including two parallel branches, one of which branches includes portion 121' of the resistance 121 (in the thermostat L), and also includes one-half of the solenoid coil 176, and the other branch including the other portion 121'' of resistance 121 and the other half of solenoid 176. As the relative proportions of the two resistance sections 121' and 121'' are changed, the relative strengths of the two currents flowing through the two branch circuits and consequently through the two halves of solenoid coil 176 will be changed accordingly. When the stronger current is flowing through the left hand end of coil 176, the core 194 of this solenoid will be drawn to the left, and conversely when this end of the coil is the weaker, the core will be drawn to the right. The amplitude of these movements of the solenoid core will be proportional to the variation in the strengths of these two currents flowing through the two halves of the solenoid coil. As has been brought out hereinabove, these variations will also be proportional to the variations in one direction or the other from the standard effective temperature for which thermostat L is adjusted.

At 197 and 198 are indicated the fields of two small electric motors, whose armatures 195 and 196, respectively, are mounted on shaft 199 carrying the worm 200 which drives the worm wheel 201 which is mounted on or geared to the crank shaft 112 (see Fig. 3) which moves the valve operating lever 99. One motor 195 rotates in one direction and the other motor 196 rotates in the opposite direction. The actuating circuit for the motors 195 and 196 includes a pair of limit switches 202 and 203, hereinafter described, and a reversing switch or balanced relay R mounted in the panel board. The reversing switch R comprises a pair of movable contact members 204, 205 which are moved by the stem 206 connected with the core 207 of solenoid 208. When the core is moved in one direction, the movable contact members will engage a pair of fixed contacts 209 and 210 and when moved in the opposite direction the movable contacts 204 and 205 will engage the fixed contacts 211 and 210, respectively. When solenoid 208 is de-energized the contacts 204 and 205 will assume a neutral position out of engagement with any of the contacts 209, 210 and 211. The actuating circuit for motor 195 extends from power lead 178 through main switch 180, wire 212, motor field 197, limit switch 202, wire 214 to fixed contact 210 of reversing switch R, movable contact 204, and wires 215, 181 and 179 back to the source of power. In a similar manner, the actuating circuit for motor 196 extends through wire 212, field 198, wire 216, limit switch 203, wire 213 to fixed contact 211 of reversing switch R, thence through movable contact 204 back to the source of power as before.

At S (in the motor mechanism K) is a proportional control switch actuated from the balanced solenoid 176. An actuating stem 218 connects the movable core 194 of solenoid 176 with the arm 219 carrying the movable contact member 220, which may be alternatively moved into engagement with either of the fixed contact members 221 and 222, shown in the form of adjustable screws. All of these parts of the switch S are carried by a supporting plate 223 which is pivoted to swing about the center 224. A bracket 225 extending from plate 223 is formed with a slot 226. The eccentric disc 227 is pivoted to rotate with worm wheel 201 and carries a movable block 228 from which a pin 229 projects into slot 226. The block 228 is adjustable radially of disc 227 by means of screw 230. It will now be apparent that when eccentric disc 227 is rotated in one direction or the other, the switch assembly S will be swung through a small arc in a corresponding direction about the pivotal axis 224. The amplitude of this swinging movement will depend upon the eccentricity of pin 229 on disc 227, this being adjustable by means of screw 230. The movable contact 220 of switch S is connected through wire 231 with the central contact of solenoid coil 208 on the panel board. Relatively fixed contact 221 of switch S is connected through wire 231', wire 173 and wire 232 with the right hand end of solenoid coil 208. Fixed contact 222 of switch S is connected through wire 233, wire 175, and wire 234 with the left hand end of solenoid coil 208.

Assuming now for the moment that the effective temperature at the location of thermostat L rises above the predetermined effective temperature for which the mechanism is adjusted this thermostatic mechanism will operate so as to move the contact member 126 to the right with relation to resistance 121, a distance which is proportionate to the variation from the predetermined effective temperature. The relative strength of the resistance section 121' will become greater than that of resistance section 121", and as a consequence, the strength of the current flowing in the right hand half of solenoid coil 176 will be proportionately greater than that flowing in the left-hand half and the core 194 will be moved to the right so as to swing movable contact 220 into engagement with fixed contact 221. The distance through which contact 220 is moved to the right (or through which it is attempted to be moved) will be proportionate to the variation from the standard effective temperature.

The engagement of contacts 220 and 221 of switch S will complete a circuit through the left-hand half of balanced solenoid 208, as follows: From transformer secondary 191 through wire 192, wire 173, wire 231', contacts 221 and 220 of switch S, wire 231, left-hand half of solenoid 208, wire 234, and wire 193 back to the transformer. This will cause solenoid 208 to swing the movable contacts 204 and 205 of switch R into engagement with the fixed contacts 211 and 210, respectively, and will complete the actuating circuit for motor 196, as already described. This motor will now rotate the worm 200 and worm wheel 201, causing a movement of shaft 112 and crank arm 113 in such a direction as to lower the left hand end of lever 99 (Fig. 2) and partially close the valves 38 and 39, or limit the possible opening movement of these valves in case the valves have already been closed by the pressure-operating mechanism. At the same time, the eccentric disc 227 will be rotated slowly in a clockwise direction, this movement causing pin 229 which engages in slot 226 to swing the switch assembly S to the right until contact 221 is disengaged from contact 220, thus breaking the circuit through balanced solenoid or relay 208, which is so constructed that it will automatically return to neutral position and break the motor circuit, thus stopping the motor 196. The arcuate extent of this swinging movement of switch bracket 223, and consequently the time during which motor 196 will operate and the distance through which the valves will be moved, will depend upon the arcuate distance through which contact member 220 has been moved by means of the balanced solenoid 176, which in turn is proportionate to the variation in temperature from the desired standard. It will thus be seen that the valves 38 and 39 will be closed an amount proportionate to the temperature variation above the desired standard effective temperature. In an exactly analogous manner, in case the effective temperature falls below the desired standard, contact 126 will be moved to the left, thus causing movable switch member 219 to close the circuit through contacts 220 and 222 of switch S, which will result in motor 195 being energized to rotate the valve operating mechanism in the opposite direction and open the valves, or rather permit them to be opened by the operation of the pressure-diaphragms. In this case, the eccentric disc 227 will be rotated in a counter-clockwise direction so as to swing the switch bracket 223 to the left until contact 222 is disengaged from movable contact 220.

By adjusting the pin 229 radially of disc 227, the distance through which the valves will be moved in proportion to any temperature variation can be adjusted. In case pin 229 is positioned substantially coaxial with disc 227, it will be noted that no swinging movement of switch assembly S will result from the rotation of the eccentric disc. In such case, the motor 195 or 196, as the case may be, would continue to rotate indefinitely, or until the movable contact 220 is returned to its central position. For this reason the limit switches 202 and 203 are provided. In the example here shown, each of these limit switches comprises a fixed contact 235 and a movable contact 236 carried by one arm 237 of a switch lever pivoted centrally at 238. A pair of arms 239 are carried by the disc 227, and when the mechanism has continued in operation long enough to entirely open or entirely close the valves, one of these arms 239 will engage the inner arm 240 of the switch lever, thus moving contact 236 away from fixed contact 235 and breaking the circuit. When the pressure is removed from switch arm 240, the contact 236 swings back into engagement with fixed contact 235.

The above discussion has assumed that switch O was thrown to the right so that the system was under the control of the "day" thermostat L. If switch O is thrown to the left, the system will be controlled in exactly the same manner by the "night" thermostat L' which is, however, adjusted to maintain a lower temperature. The automatic switch O is under the control of the time-controlled mechanism indicated generally at T. The detailed construction of this time-controlled mechanism is not a part of this invention, the apparatus used being of the type in which the quick-acting switch 241 is operated directly from the clock mechanism and is closed at a certain hour to throw the thermostat L' into control, and is opened in the morning to again place thermostat L in control. The switch 242 is automatically closed at periodic intervals to energize the motor 243 to rewind the clock. When switch 241 is closed by the clock mechanism, a circuit is completed between the two power-lines 188 and 189 as follows: Through wire 244, magnet coil 169 of switch O, wire 245 to the switch 241, and wire 246 to power line 189. The energization of magnet 169 throws switch O to the left so as to place the night thermostat in control.

If manually operated switch P is thrown from its upper to its lower position, the automatic control by means of the thermostats is thrown out of service, and the heating system may now be controlled manually by means of the apparatus indicated generally at V. This comprises a fixed resistance 247 which corresponds to the resistance 121 in the thermostat L. A movable contact 248 engages this resistance intermediate its ends, the contact member being carried by a pointer 249 pivotally mounted at its lower end 250. The pointer is operable by a knob 251 positioned on the face of the panel board M, and the upper end of the pointer indicates the resulting position of the valves on the dial or scale indicated at 252 (see Fig. 9). The movable contact 248 is connected by wire 253 with the lower central contact of switch P, and the two lower outside contacts of this switch are connected by wires 254 and 255 with the respective ends of resistance 247. By manually moving the contact 248 by turning knob 251, the relative proportions of the two sections into which resistance 247 is divided will control the heating system in exactly the same manner as described in connection with the automatic operation of the thermostats L and L'. The wires 253, 254 and 255 simply take the place, in the control circuit first described, of the wires 129, 130 and 131.

The temperature indicator W on the panel board comprises a balanced solenoid 256 which is connected in parallel, through wires 257, 258 and 259 with the balanced solenoid 176 which operates the proportioning switch S. The core of this solenoid 256 operates, through plunger 260, a pointer 261, which indicates the room temperature on a dial or scale 262.

A pair of signal lights 263 and 264 on the control panel M indicate at any moment whether the steam supply is being increased or decreased. One side of each of these lights is connected through wire 265 with the power line 139. The other side of light 263 is connected through wire 266 with the fixed contact 210 of switch R, and the other light 264 is connected through wire 267 with the fixed contact 211 of switch R. The movable contact 204 of switch R completes the circuit through one signal light or the other, depending on whether it is in engagement with fixed contact 211 or fixed contact 210.

Figure 9:
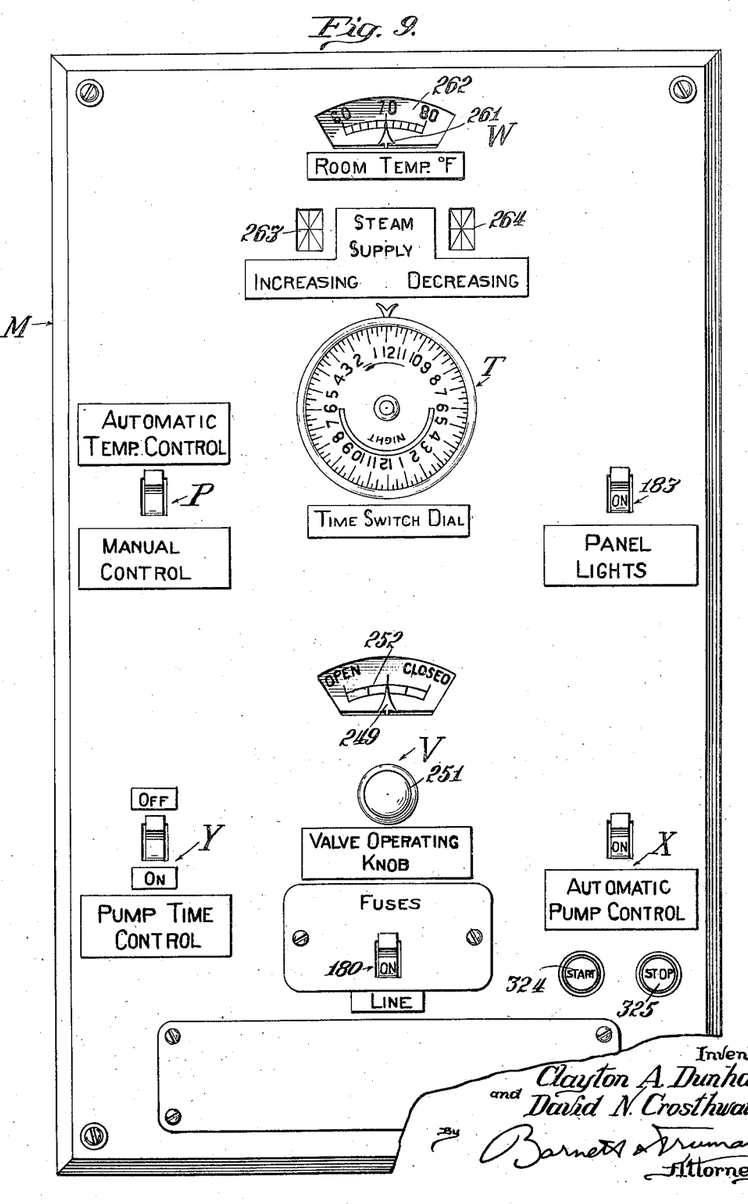
Fig. 9 is a front elevation of the control panel.

It will be noted that the constantly burning illuminating lights 186 and 187 (already described) are not indicated in Fig. 9, since indirect lighting of the panel board is used. However, these lights, if desired could be placed on the face of the board for direct lighting.

The motor 8 which drives the pump 7 is directly controlled through the mechanism indicated at N in Fig. 10, which, as already stated, may be positioned adjacent the motor. The pump is also controlled through a series of mechanisms mounted on the panel board M, among which is a switch X by means of which the automatic control of the pump can be thrown out of service and a manual control substituted; a switch Y which determines whether or not the time-controlled mechanism shall effect the operation of the pump, and a quick-acting relay Z. The pump motor and the controlling devices therefor do not receive their power from the same power source 177 from which the mechanisms previously described are energized, but from a separate source of current, here indicated by the three alternating current power lines 268, 269 and 270 (see lower left hand corner of Fig. 10). At 271 are indicated the terminals of a three-phase alternating current motor 8 or the starter therefor. At 272 is indicated a three-pole switch which is normally open to stop the motor, but which may be closed to start the motor by means of the electromagnet 273. At 274 is indicated a thermal overload relay which is normally closed and is in circuit with the actuating magnet 273. In case of an excessive current or overload, this switch 274 will open in well known manner so as to break the motor circuit. Whenever switch 31 is closed (this switch being controlled by a float in the accumulator tank G, as already described) a circuit will be completed through one phase of the alternating current circuit as follows: From wire 268 through wire 275, switch 31, wire 276, magnet 273, and thermal switch 274 to the power line 269. In this manner the motor will be started to operate the exhausting mechanism whenever a sufficient quantity of condensate has collected in the accumulator tank G, and the motor will be stopped whenever this condensate has been withdrawn into the separating tank 6 since the switch 31 will then open and de-energize magnet 273. The switch 31 is in control of the pump motor in the above described manner at all times, regardless of the positioning of the several mechanisms on the panel board, as hereinafter described.

Wires 277 and 278, through which this same energizing circuit for magnet 273 may also be completed, extend respectively to the terminals 279 and 280 of an automatic switch 281 positioned on the panel board. This switch 281 is normally closed so as to extend the circuit to terminals 282 and 283 from which wires 284 and 285 extend, respectively, to the two fixed contacts 286 and 287 of the relay Z. The movable contact plate 288 of this relay may be moved up to close the circuit through contacts 286 and 287 by means of the magnet device indicated at 289. Whenever the relay Z is closed in this manner, the circuit will be completed through wires 277 and 278 so as to energize magnet 273 and close switch 272, thus starting the motor 8.

The energizing circuit for magnet 289 which closes the relay Z includes the switch 21 of differential-pressure controller J, one side of which is connected through wire 290 with the central power lead 269, and the other side of which is connected through wire 291 with terminal 292 of the relay device. A wire 293 extends from this terminal to the magnet 289. It will thus be apparent that whenever the necessary pressure differential has been established, and switch 21 has consequently been opened, the magnet 289 will be de-energized, and consequently the pump motor will cease to operate.

When the automatic control of the pump motor is in effect, the switch X will be closed, at which time the actuating circuit for magnet 289 will extend from this magnet through wire 294, terminal 295, wire 296, through one arm of switch X, wire 297 to the movable contact 205 of switch R, fixed contact 209, wire 298, central arm of switch X, wire 299, terminal 300, and wire 301 to fixed contact 287 of relay Z, thence back through wires 285 and 277 to the power lead 268, thus completing the energizing circuit for magnet 289 through one phase of the alternating current circuit whenever differential-controller switch 21 is closed and the switch R is moved to the right, which latter will occur when the valve is adjusted for increasing the steam supply. The energization of magnet 289 will close the movable contact 288 of relay Z against the fixed contacts 286 and 287 and result in the closing of switch 272 and the starting of the pump motor. A holding circuit will now be completed through magnet 289 which will hold the relay closed even though the movable contact 205 of switch R moves away from the fixed contact 209. This holding circuit extends from magnet 289 through wire 294, resistance 302 which cuts down the current flowing through this shunt circuit, and wire 303 to fixed contact 286 of relay Z, movable contact 288, fixed contact 287 and thence as in the original circuit. This circuit will remain complete and the pump will continue in operation until the pressure differential has been established and switch 21 is opened, or until the desired effective temperature has been established, at which time the energizing circuit for magnet 289 is short-circuited, by means of the temperature-indicator W. The pointer 261 of this temperature indicator carries a contact 304 which is adapted to engage a contact 305 carried by a lever 306 which is moved about its fulcrum 307 by a plunger 308 extending from the humidity-compensator 309.

The object of this humidity compensator 309 is to so vary the position of movable contact 305 that the engagements between contacts 304 and 305 will occur at a higher temperature for decreasing humidities and at a lower temperature for increasing humidities. This is because the pointer 261 will actually read somewhat high when the humidity is decreasing, and low when the humidity is increasing, although the reading will be accurate when conditions become stabilized. The construction of this humidity compensator 309 may be similar to that already described in connection with the thermostat L, or any other suitable form. When the effective temperature has been raised to such a point that contact 304 engages contact 305, a shunt circuit about the magnet 289 is established as follows: From terminal 292 through wire 310, resistance 311, wire 312, terminal 313, wire 314, switch X, wire 315, contacts 305 and 304 of temperature indicator W, wire 316, switch X, wire 296 and thence as in the previously described circuit. The completion of this circuit will short circuit magnet 289 and cause the relay Z to open, whereupon the pump motor will stop.

It is sometimes desirable in the interest of economy, or for some other reason, to have the differential-pressure control and thermostatic control of the pump continue only in the day time, but be thrown out of service at night, at which time the pump is only started by means of switch 31 when sufficient condensate has accumulated in the tank G. In order to bring about this operation, the switch X remains closed, but switch Y is thrown to its lower position so that, as indicated on the panel board M, the pump-time control is in force. The normally closed switch 281 is automatically opened whenever the magnet 317 is energized. This magnet is energized whenever the time-control mechanism T has thrown the night thermostat L' into control, the circuit being as follows: From wire 244 through wire 318, magnet 317, wire 319, one arm of switch Y, the wire 320 to wire 245. This circuit is in parallel with the energizing circuit for magnet 169 of switch O, so that it will be seen that whenever the switch O is thrown to place night thermostat L' in operation, the magnet 317 will be simultaneously energized to open the switch 281, thus breaking the automatic control circuits for the pump. It will be noted that when switch Y is in its upper position (so as to throw out the time-control of the pump) a shunt circuit is formed around the automatic switch 281 through wires 321, 322, switch Y and wires 323 and 324. Thus, even though switch 281 is opened as the result of the time mechanism T, throwing the thermostat L' into service, the pump control circuits will still remain complete.

If switch X is opened so as to throw the automatic pump control out of operation, the pump motor can still be stopped and started manually by means of the push-button switches 324 and 325, that is, providing the pressure differential has not been established and switch 21 at the differential controller is closed. The switch 324 completes a shunt circuit between wires 296 and 299 so as to temporarily establish the same circuit that is automatically closed by the engagement of moveable contact 205 of switch R with fixed contact 209. This will cause magnet 289 to be energized and close the relay Z and since a holding circuit for this magnet is immediately completed, as already described, the closing of push button switch 324 need only be momentary. The stopping switch 325 is connected between the wires 296 and 314 so as to momentarily complete the same short-circuiting circuit that is automatically closed by the pointer 261 of temperature indicator W.

Referring now briefly to the general operation of this heating system, the production of steam at the generator A will be so regulated by means of suitable damper or burner controls, as to supply steam at substantially the proper sub-atmospheric pressure to replace heat lost from the building. The pressure-operated controller C will respond to variations in the pressure differential between the supply and return sides of the system so as to maintain the radiators D filled or partially filled with steam at a pressure approximately sufficient to replace these heat losses. In addition to this differential pressure control and in direct cooperation therewith is the automatic temperature and humidity control mechanism whereby a substantially constant effective temperature is maintained in the building being heated. The greater part of the manually operable devices for regulating the heating system, and the apparatus for indicating the condition of the heating system, are centralized on the panel board M which may be positioned in any convenient location. In case a fully automatic control of the heating system is to be maintained throughout the day and night, the several switches are positioned as shown in Fig. 9. Switch P is thrown up so as to place the automatic temperature control system in service. Switch X is also thrown up to insure automatic control of the pump. Switch Y is thrown up so as to put the time-control of the pump out of service, that is the pump will be automatically controlled by the differential controller and thermostat at night, as well as by day. By a suitable adjustment of the time controller T, the system will be thrown from the control of the day thermostat L to the control of the night thermosat L' at a determined hour in the evening, and will be returned to the control of the day thermostat L at a certain hour in the morning. Under these conditions, whenever the effective temperature at the location of thermostat L (or L') exceeds the predetermined standard effective temperature for which the thermostat is adjusted, or the average effective temperature throughout the building exceeds the standard temperature in case a plurality of thermostats are used, this thermostatic mechanism will cause the electrically operated mechanism K to partially close the valve C and cut down the flow of steam to the radiators. The valve C will still be under the control of the differential-pressure operating mechanism, but the maximum opening of the valve C will be limited by the position of control lever 99, which is determined by the action of the thermostatic mechanism. In case the effective temperature falls below the desired standard, lever 99 will be automatically adjusted so as to permit a wider opening of the control valve C, and this opening of the valve will be effected by the differential-pressure control mechanism at such a rate as to maintain the proper efficient supply of steam to the radiators. If the steam supply is being increased at any time, this will be indicated by the signal light 263 on the panel board, and if the steam supply is being decreased, the light 264 will be lighted. The room temperature existing at the thermostat or thermostats is indicated by the mechanism W on the panel board. At the same time, the pump motor is being automatically controlled so as to maintain the necessary pressure-differential between the supply and discharge sides of the radiators. Whenever this pressure differential has been established, the pump will be stopped by the opening of switch 21, no matter what the positioning of the other control apparatus may be. In the interest of economy, the pump will be automatically stopped whenever the effective temperature, as registered by the thermostats, has been raised to such a point that the temperature indicator W will close the switch at contacts 304 and 305. At such times, the supply of steam is being cut down and the functioning of the pump is temporarily unnecessary. However, as soon as the thermostats indicate the need for an increase of the steam supply, the switch R will close the control circuit at 205, 209 so that the pump can again operate, in case the necessary pressure differential is no longer established and the switch 21 is closed. In any event, the pump can be started in operation at any time by the closing of switch 31 in order to remove an excess of condensate from the accumulator tank G.

In case it is desired to discontinue the differential-pressure control of the pump at night, the switch Y is thrown to its lower position, whereupon the pump will be automatically controlled as above described during the day time, but at night will only be operated when necessary to remove condensate from the accumulator tank. By throwing switch X to its lower position, the automatic operation of the pump by means of the differential-controller and the thermostatic mechanism can be entirely discontinued without affecting the automatic operation of the remainder of the mechanism. At such time, or in fact at any time, the pump can be automatically started and stopped at will, by means of the push buttons 324 and 325.

In case it is desired to throw the thermostatic control mechanism out of service and control the system manually, the switch P is thrown to its lower position. The operator can then control the system to increase or decrease the possible opening of valve C and thus regulate the steam supply by turning the knob 251 on the panel board, the positioning of the valve being indicated on the scale 252.

The entire electrical temperature control system, as centralized on the panel board, can be thrown out of service by opening the main switch 180. However, even under these conditions the heating system will still be operable, although in a less effective manner. It will be remembered that the pump motor is supplied from a separate alternating current circuit, and the pump will still be automatically thrown into operation whenever a sufficient quantity of condensate has accumulated in tank G so as to remove this condensate and at the same time, incidentally, somewhat lower the pressure in the return main F. Since the exhausting mechanism is not in operation a sufficient portion of the time to maintain the pressure differential, the valve C will remain open and steam from generator A can flow continuously into the radiators.

Figure 5:
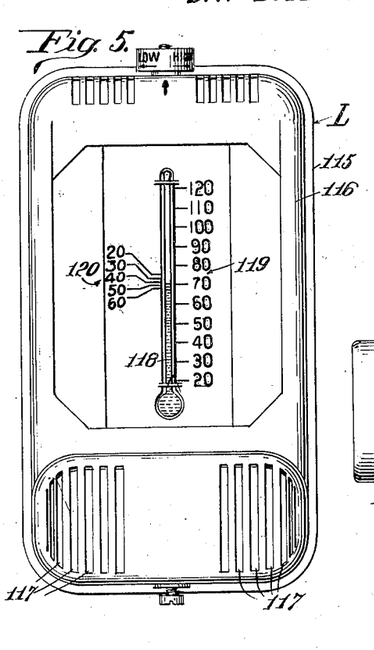
Fig. 5 is a front elevation of one of the improved thermostats.

Since the thermostat L is adjusted to automatically maintain "effective" temperatures, it will be apparent that the dry-bulb temperature indicated by thermometer 118 on the scale 119 corresponds to a known relative humidity and that the prevailing relative humidity can consequently be read directly on the scale 120 at the left. This is a simple and convenient means for indicating the relative humidity so that suitable steps can be taken to correct the humidity if it is too low.

While the mechanism hereinabove disclosed by way of example is especially designed for use with a heating system utilizing steam at sub-atmospheric pressures, it will be apparent that the invention, in its broader aspects, relates to a system of maintaining effective temperatures in accordance with changes both in the temperature and the humidity of the air, and can be applied to other types of heating systems, such as those utilizing steam at super-atmospheric pressures, or hot water, as a heating medium. The invention discloses a system of air-conditioning wherein, instead of attempting to regulate the actual humidity of the air, the dry-bulb temperature is varied inversely with changes in the humidity. From this broad viewpoint, the actual heating medium used is of secondary importance.

We claim:

1. A steam heating system comprising a radiator, a steam supply conduit leading thereto, a steam control valve in this conduit, a discharge conduit leading from the radiator, a steam trap in the discharge conduit, an exhausting mechanism for lowering the pressure in the discharge conduit and removing condensate, a motor for driving the exhausting mechanism, means for adjusting the steam control valve, means for starting the motor whenever the pressure differential between the supply and discharge conduits falls below a predetermined standard and the valve is adjusted to increase the supply of steam to the radiator and for stopping the motor when the pressure differential has been established, and means automatically actuated whenever the valve is adjusted to decrease the supply of steam to the radiator for stopping the motor regardless of the condition of the pressure differential.

2. A steam heating system comprising a radiator, a steam supply conduit leading thereto, a steam control valve in this conduit, a discharge conduit leading from the radiator, a steam trap in the discharge conduit, an exhausting mechanism for lowering the pressure in the discharge conduit and removing condensate, a motor for driving the exhausting mechanism, means for adjusting the steam control valve, a control circuit for the motor whereby the motor is started when the circuit is completed and stopped when the circuit is broken, a switch in the circuit, means for closing the switch whenever the pressure differential between the supply and discharge conduits falls below a predetermined standard and for opening the switch when the pressure differential is established, a second switch in the circuit, means for closing this switch whenever the valve has been adjusted for increasing the steam supply and for opening the switch whenever the valve is adjusted for decreasing the steam supply, and means for breaking the circuit whenever a predetermined temperature is established in the space being heated.

3. A steam heating system comprising a radiator, a steam supply conduit leading thereto, a steam control valve in this conduit, a discharge conduit leading from the radiator, a steam trap in the discharge conduit, an exhausting mechanism for lowering the pressure in the discharge conduit and removing condensate, a motor for driving the exhausting mechanism, means for adjusting the steam control valve, a control circuit for the motor whereby the motor is started when the circuit is completed and stopped when the circuit is broken, a switch in the circuit, means for closing the switch whenever the pressure differential between the supply and discharge conduits falls below a predetermined standard and for opening the switch when the pressure differential is established, a second switch in the circuit, means for closing this switch whenever the valve has been adjusted for increasing the steam supply and for opening the switch whenever the valve is adjusted for decreasing the steam supply, means for breaking the circuit whenever a predetermined temperature is established in the space being heated and means for completing the circuit and starting the motor whenever a predetermined quantity of condensate has accumulated in the system and opening the circuit when the condensate has been withdrawn, regardless of the positioning of the other control devices.

4. Temperature controlling apparatus for a heating system, comprising a radiating system, a supply valve for determining the flow of heating medium to the radiating system, a thermostatically and hygroscopically controlled device positioned at a location remote from the valve and comprising balancing resistances which are proportionately varied in response to variations from a predetermined effective temperature, motor mechanism for proportionately adjusting the size of the valve opening, and control circuits including the resistances for determining the direction and amount of rotation of the motor mechanism in accordance with the variations from the predetermined effective temperature at the remote location.

CLAYTON A. DUNHAM.
DAVID N. CROSTHWAIT, Jr.